(12) United States Patent
Raichelgauz et al.

(10) Patent No.: US 8,818,916 B2
(45) Date of Patent: Aug. 26, 2014

(54) SYSTEM AND METHOD FOR LINKING MULTIMEDIA DATA ELEMENTS TO WEB PAGES

(75) Inventors: Igal Raichelgauz, Herzelia (IL); Karina Ordinaev, Haifa (IL); Yehoshua Y. Zeevi, Haifa (IL)

(73) Assignee: Cortica, Ltd., Ramat Gan (IL)

( * ) Notice: Subject to any disclaimer, the term of this patent is extended or adjusted under 35 U.S.C. 154(b) by 625 days.

(21) Appl. No.: 12/822,005

(22) Filed: Jun. 23, 2010

(65) Prior Publication Data

US 2010/0262609 A1 Oct. 14, 2010

Related U.S. Application Data

(63) Continuation-in-part of application No. 12/084,150, filed as application No. PCT/IL2006/001235 on Oct. 26, 2006, now Pat. No. 8,655,801, application No. 12/822,005, which is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, which is a continuation-in-part of application No. 12/348,888, filed on Jan. 5, 2009, which is a continuation-in-part of application No. 12/538,495, filed on Aug. 10, 2009, now Pat. No. 8,312,031, which is a continuation-in-part of application No. 12/507,489, filed on Jul. 22, 2009, now Pat. No. 8,386,400, which is a continuation-in-part of application No. 12/603,123, filed on Oct. 21, 2009, now Pat. No. 8,266,185.

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06N 5/00* (2006.01)
*G06N 5/02* (2006.01)

(52) U.S. Cl.
CPC ....................................... *G06N 5/02* (2013.01)
USPC ........................................................... 706/10

(58) Field of Classification Search
CPC ....................................................... G06N 5/02
USPC ........................................................... 706/10
See application file for complete search history.

(56) References Cited

U.S. PATENT DOCUMENTS 5,940,821 A 8/1999 Wical
5,987,454 A 11/1999 Hobbs (Continued)

FOREIGN PATENT DOCUMENTS

WO 02/31764 4/2002
WO 2007/049282 5/2007

OTHER PUBLICATIONS

Jonathan Foote ("Content-Based Retrieval of Music and Audio" 1997).*

(Continued)

*Primary Examiner* — Lut Wong
(74) *Attorney, Agent, or Firm* — Myers Wolin, LLC

(57) ABSTRACT

A method for linking between a multimedia data element (MMDE) and a web page. The method comprises receiving a MMDE from a source; generating a signature representative of the MMDE using a signature generator; matching the generated signature with a plurality of signatures stored in a database to find at least one matching signature; extracting a universal resource locator (URL) of a web page associated with the matching signature, wherein the URL is part of a metadata of the matching signature; and providing the URL to the source over a network.

19 Claims, 8 Drawing Sheets

(56) References Cited

U.S. PATENT DOCUMENTS

| | | | |
|---|---|---|---|
| 6,038,560 | A | 3/2000 | Wical |
| 6,240,423 | B1 | 5/2001 | Hirata |
| 6,243,375 | B1 | 6/2001 | Speicher |
| 6,363,373 | B1 | 3/2002 | Steinkraus |
| 6,493,692 | B1 | 12/2002 | Kobayashi et al. |
| 6,493,705 | B1 | 12/2002 | Kobayashi et al. |
| 6,523,022 | B1 | 2/2003 | Hobbs |
| 6,526,400 | B1 | 2/2003 | Takata et al. |
| 6,560,597 | B1 | 5/2003 | Dhillon et al. |
| 6,601,060 | B1 | 7/2003 | Tomaru |
| 6,611,628 | B1 | 8/2003 | Sekiguchi et al. |
| 6,611,837 | B2 | 8/2003 | Schreiber |
| 6,675,159 | B1 | 1/2004 | Lin et al. |
| 6,728,706 | B2 | 4/2004 | Aggarwal et al. |
| 6,754,435 | B2 | 6/2004 | Kim |
| 6,807,306 | B1 | 10/2004 | Girgensohn et al. |
| 6,819,797 | B1 | 11/2004 | Smith et al. |
| 6,836,776 | B2 | 12/2004 | Schreiber |
| 6,901,207 | B1 | 5/2005 | Watkins |
| 6,970,881 | B1 | 11/2005 | Mohan et al. |
| 6,978,264 | B2 | 12/2005 | Chandrasekar et al. |
| 7,013,051 | B2 | 3/2006 | Sekiguchi et al. |
| 7,124,149 | B2 | 10/2006 | Smith et al. |
| 7,260,564 | B1 | 8/2007 | Lynn et al. |
| 7,296,012 | B2 | 11/2007 | Ohashi |
| 7,302,117 | B2 | 11/2007 | Sekiguchi et al. |
| 7,313,805 | B1 | 12/2007 | Rosin et al. |
| 7,346,629 | B2 | 3/2008 | Kapur et al. |
| 7,392,238 | B1 | 6/2008 | Zhou et al. |
| 7,406,459 | B2 | 7/2008 | Chen et al. |
| 7,450,740 | B2 | 11/2008 | Shah et al. |
| 7,523,102 | B2 | 4/2009 | Bjarnestam et al. |
| 7,536,384 | B2 | 5/2009 | Venkataraman et al. |
| 7,542,969 | B1 | 6/2009 | Rappaport et al. |
| 7,548,910 | B1 | 6/2009 | Chu et al. |
| 7,555,477 | B2 | 6/2009 | Bayley et al. |
| 7,555,478 | B2 | 6/2009 | Bayley et al. |
| 7,562,076 | B2 | 7/2009 | Kapur |
| 7,574,436 | B2 | 8/2009 | Kapur et al. |
| 7,574,668 | B2 | 8/2009 | Nunez et al. |
| 2002/0174120 | A1* | 11/2002 | Zhang et al. ............. 707/7 |
| 2003/0041047 | A1 | 2/2003 | Chang et al. |
| 2003/0195883 | A1* | 10/2003 | Mojsilovic et al. ........ 707/6 |
| 2004/0153426 | A1 | 8/2004 | Nugent |
| 2005/0177372 | A1 | 8/2005 | Wang et al. |
| 2006/0031216 | A1 | 2/2006 | Semple et al. |
| 2006/0236343 | A1 | 10/2006 | Chang |
| 2006/0253423 | A1 | 11/2006 | McLane et al. |
| 2007/0009159 | A1 | 1/2007 | Fan |
| 2007/0011151 | A1 | 1/2007 | Hagar et al. |
| 2007/0038608 | A1 | 2/2007 | Chen |
| 2007/0074147 | A1 | 3/2007 | Wold |
| 2007/0130112 | A1 | 6/2007 | Lin |
| 2007/0130159 | A1 | 6/2007 | Gulli et al. |
| 2007/0174320 | A1 | 7/2007 | Chou |
| 2007/0244902 | A1 | 10/2007 | Seide et al. |
| 2007/0253594 | A1 | 11/2007 | Lu et al. |
| 2007/0268309 | A1 | 11/2007 | Tanigawa et al. |
| 2007/0282826 | A1 | 12/2007 | Hoeber et al. |
| 2007/0294295 | A1 | 12/2007 | Finkelstein et al. |
| 2008/0072256 | A1 | 3/2008 | Boicey et al. |
| 2008/0172615 | A1 | 7/2008 | Igelman et al. |
| 2008/0201299 | A1 | 8/2008 | Lehikoinen et al. |
| 2009/0037408 | A1 | 2/2009 | Rodgers |
| 2009/0089587 | A1 | 4/2009 | Brunk et al. |

OTHER PUBLICATIONS

Lin et al ("Generating Robust Digital Signature for Image/Video Authentication" 1998).*
Stolberg et al ("HiBRID-SoC: A Multi-Core SoC Architecture for Multimedia Signal Processing" 2005).*
Löytynoja et al ("Audio Encryption Using Fragile Watermarking" 2005.*
Gomes et al ("Audio Watermarking and Fingerprinting: For Which Applications?" 2002).*
Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.
Jaeger, H: "The "echo state" approach to analysing and training recurrent neural networks", GMD Report, No. 148, 2001, pp. 1-43, XP002466251 German National Research Center for Information Technology.
Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.
Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.
Xian-Sheng Hua et al. "Robust Video Signature Based on Ordinal Measure" In: 2004 International Conference on Image Processing, Microsoft Research Asia, Beijing 100080, China, 2004, pp. 685-688.
International Search Authority: "Written Opinion of the International Searching Authority" (PCT Rule 43bis.1) Date of Mailing: Jan. 28, 2009.
Maass, W. et al.: "Computational Models for Generic Cortical Microcircuits", Institute for Theoretical Computer Science, Technische Universitaet Graz, Graz, Austria, published Jun. 10, 2003.
International Search Report for the related International Patent Application PCT/IL2006/001235; Date of Mailing: Nov. 2, 2008.
Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; Date of Issuance: Jul. 28, 2009.
Lin, C.; Chang, S.: "Generating Robust Digital Signature for Image/ Video Authentication", Multimedia and Security Workshop at ACM Mutlimedia '98; Bristol, U.K., Sep. 1998; pp. 49-54.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Cernansky et al., "Feed-forward Echo State Networks"; Proceedings of International Joint Conference on Neural Networks, Montreal, Canada, Jul. 31-Aug. 4, 2005.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Freisleben et al., "Recognition of Fractal Images Using a Neural Network", Lecture Notes in Computer Science, 1993, vol. 6861, 1993, pp. 631-637.

(56) References Cited

OTHER PUBLICATIONS

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Ahonen-Myka http://www.cs.helsinki.fi/u/linden/teaching/irm06/handouts/irom05_7.pdf, 2006, pp. 5.

IPO Examination Report under Section 18(3) for corresponding UK application No: GB1001219.3, dated Sep. 12, 2011.

Foote, Jonathan et al., "Content-Based Retrieval of Music and Audio"; 1997, Institute of Systems Science, National University of Singapore, Singapore (Abstract).

\* cited by examiner

SYSTEM AND METHOD FOR LINKING MULTIMEDIA DATA ELEMENTS TO WEB PAGES

CROSS-REFERENCE TO RELATED APPLICATIONS

This application is a continuation-in-part of:

(1) U.S. patent application Ser. No. 12/084,150 having a filing date of Apr. 7, 2009, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006;

(2) U.S. patent application Ser. No. 12/195,863, filed Aug. 21, 2008, now pending, which claims priority under 35 USC 119 from Israeli Application No. 185414, filed on Aug. 21, 2007, and which is also a continuation-in-part (CIP) of the above-referenced U.S. patent application Ser. No. 12/084, 150;

(3) U.S. patent application Ser. No. 12/348,888, filed Jan. 5, 2009, now pending, which is a CIP of U.S. patent application Ser. No. 12/084,150, filed on Apr. 7, 2009 and U.S. patent application Ser. No. 12/195,863 filed on Aug. 21, 2008;

(4) U.S. patent application Ser. No. 12/507,489, filed Jul. 22, 2009, now pending, which is a CIP of U.S. patent application Ser. No. 12/084,150, filed on Apr. 7, 2009 and U.S. patent application Ser. No. 12/195,863 filed on Aug. 21, 2008;

(5) U.S. patent application Ser. No. 12/538,495, filed Aug. 10, 2009, now pending, which is a CIP of U.S. patent application Ser. No. 12/084,150 filed on Apr. 7, 2009, U.S. patent application Ser. No. 12/195,863, filed on Aug. 21, 2008; and U.S. patent application Ser. No. 12/348,888, filed Jan. 5, 2009; and (6) U.S. patent application Ser. No. 12/603,123, filed Oct. 21, 2009, now pending which is a CIP of U.S. patent application Ser. No. 12/084,150, filed on Apr. 7, 2009, U.S. patent application Ser. No. 12/195,863 filed on Aug. 21, 2008, U.S. patent application Ser. No. 12/348,888, filed Jan. 5, 2009, and U.S. patent application Ser. No. 12/538,495, filed Aug. 10, 2009.

All of the applications referenced above are herein incorporated by reference.

TECHNICAL FIELD

The invention generally relates to content-management and search engines, and more particularly relates to the automatic association of content to a web page using signatures.

BACKGROUND OF THE INVENTION

With the abundance of multimedia data made available through various means in general and the Internet and worldwide web (WWW) in particular, there is a need for effective ways of searching for, and management of such multimedia data. Searching, organizing and management of multimedia data in general and video data in particular may be challenging at best due to the difficulty to represent and compare the information embedded in the video content, and due to the scale of information that needs to be checked. Moreover, when it is necessary to find a content of video by means of textual query, prior art cases revert to various metadata that textually describe the content of the multimedia data. However, such content may be abstract and complex by nature and not necessarily adequately defined by the existing and/or attached metadata.

The rapid increase in multimedia databases, accessible for example through the Internet, calls for the application of new methods of representation of information embedded in video content. Searching for multimedia in general and for video data in particular is challenging due to the huge amount of information that has to be priory indexed, classified and clustered. Moreover, prior art techniques revert to model-based methods to define and/or describe multimedia data. However, by its very nature, the structure of such multimedia data may be too abstract and/or complex to be adequately represented by means of metadata. The difficulty arises in cases where the target sought for multimedia data is not adequately defined in words, or by respective metadata of the multimedia data. For example, it may be desirable to locate a car of a particular model in a large database of video clips or segments. In some cases, the model of the car would be part of the metadata but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "the Architecture") that is described in a PCT patent application publication number WO2007/049282 and published on May 3, 2007, entitled "A Computing Device, a System and a Method for Parallel Processing of Data Streams", assigned to common assignee, is hereby incorporated by reference for all the useful information it contains. Generally, the Architecture consists of a large ensemble of randomly, independently, generated, heterogeneous processing cores, mapping in parallel data-segments onto a high-dimensional space and generating compact signatures for classes of interest.

Searching multimedia data has been a challenge of past years and has therefore received considerable attention. Early systems would take a multimedia data element in the form of, for example an image, compute various visual features from it and then search one or more indexes to return images with similar features. In addition values for these features and appropriate weights reflecting their relative importance could be also used. Searching and indexing techniques have improved over time to handle various types of multimedia inputs and handle them in an ever increasing effectiveness. However, since the exponential growth of the use of the Internet and the multimedia data available there, these prior art systems have become less effective in handling the multimedia data, due to the vast amounts already existing, as well as the speed at which new ones are added.

Searching has therefore become a significant challenge and even the addition of metadata to assist in the search has limited functionality. Firstly, metadata may be inaccurate or not fully descriptive of the multimedia data, and secondly, not every piece of multimedia data can be accurately enough described by a sequence of textual metadata. A query model for a search engine has some advantages, such as comparison and ranking of images based on objective visual features, rather than on subjective image annotations. However, the query model has its drawbacks as well. Certainly when no metadata is available and only the multimedia data needs to be used, the process requires significant effort. Those skilled in the art should appreciate that there is no known intuitive way of describing multimedia data. Therefore, a large gap may be found between a user's perception or conceptual understanding of the multimedia data and the way it is actually stored and manipulated by a search engine.

Current generation of web applications have become more and more effective at aggregating massive amounts of data of different multimedia content, such as, pictures, videos, clips, paintings and mash-ups, and are capable of slicing and dicing it in different ways, as well as searching it and displaying it in an organized fashion, by using, for example, concept networks. A concept may enable understanding of a multimedia data from its related concept. However, current art is unable to add any real "intelligence" to the mix of multimedia content. That is, no new knowledge is extracted from the multimedia data that are aggregated by such systems. Moreover, the systems tend to be non-scalable due to the vast amounts of data they have to handle. This, by definition hinders the ability to provide high quality searching for multimedia content.

There is therefore a need in the art to overcome the deficiencies of the prior art solutions and provide the building element for a search engine for content-management of multimedia data that is intelligent, effective and scalable.

SUMMARY OF THE INVENTION

Certain embodiments of the invention include a method for linking between a multimedia data element (MMDE) and a web page. The method comprises receiving a MMDE from a source; generating a signature representative of the MMDE using a signature generator; matching the generated signature with a plurality of signatures stored in a database to find at least one matching signature; extracting a universal resource locator (URL) of a web page associated with the matching signature, wherein the URL is part of a metadata of the matching signature; and providing the URL to the source over a network.

Certain embodiments of the invention further include a system for automatic linking between a multimedia data element (MMDE) and a web page. The system comprises a database containing a plurality of signatures, wherein at least a portion of the plurality of signatures having a universal resource locator (URL) of a respective web page associated to as a metadata; a signature generator for receiving a MMDE from a source through a network and generating a signature for the MMDE; and a matching engine for matching the generated signature for the MMDE to the plurality of signatures stored in the database and outputting the URL of at least one a signature matching the generated signature; thereby responsive to receiving the MMDE a web page respective of the URL can be accessed.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
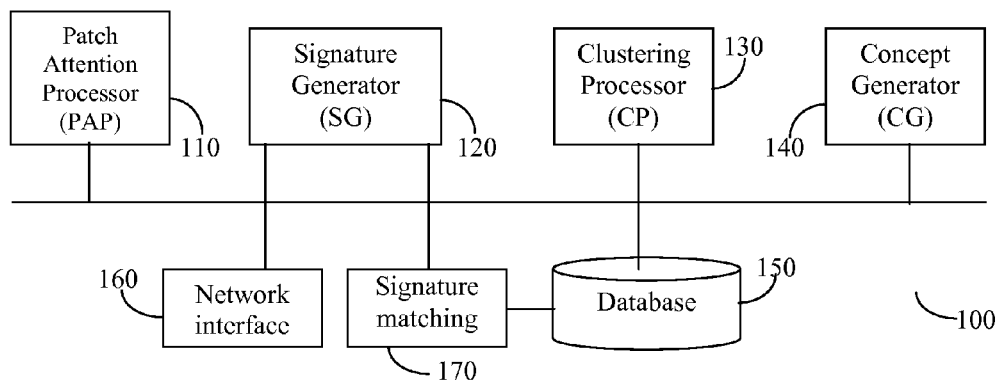
FIG. 1 is a diagram of a DCC system for creating concept structures in accordance with the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with certain exemplary embodiments of the invention a system for generating concept structures respective of a plurality of multimedia data elements (MMDEs) is further used to provide universal resource locators (URLs) associated with signatures to enable access of web pages responsive of input MMDEs. The system comprises a unit for the generation of signatures and enabling the generation of a signature of the received MMDE and comparing that signature to a plurality of signatures stored in the database of the unit. When a match is found a URL associated with a matched signature is extracted, enabling access to a web page, thereby providing an automatic way to provide a display of a web page responsive of a MMDE input.

FIG. 1 shows an exemplary and non-limiting diagram of a DCC system 100 for creating concept structures provided in accordance with the invention. The DCC system 100 is capable of receiving multimedia data elements (MMDEs), for example from the Internet via the network interface 160. The MMDEs include, but are not limited to, images, graphics, video streams, video clips, audio streams, audio clips, video frames, photographs, images of signals, combinations thereof, and portions thereof. The images of signals are images such as, but not limited to, medical signals, geophysical signals, subsonic signals, supersonic signals, electromagnetic signals, and infrared signals. In one embodiment of the invention, the MMDEs are stored in a database (DB) 150. In another embodiment of the invention, references to the MMDEs are kept in the DB 150 for future retrieval of the respective multimedia data element. Such a reference may be, but is not limited to, a universal resource locator (URL).

Every MMDE in the DB 150, or referenced therefrom, is then processed by a patch attention processor (PAP) 110 resulting in a plurality of patches that are of specific interest, or otherwise of higher interest than other patches. In one embodiment of the invention a more general pattern extraction, such as an attention processor (AP) is used in lieu of patches. The PAP 110 receives the MMDE that is partitioned into items; an item may be an extracted pattern or a patch, or any other applicable partition depending on the type of the MMDE. The functions of the PAP 110 are described herein below in more detail. Those patches that are of higher interest are then used by a signature generator (SG) 120 to generate signatures respective of the patch. The operation of the SG 120 is described in more detail herein below.

A clustering process (CP) 130 initiates a process of inter-matching of the signatures once it determines that there are a number of patches that is above a predefined threshold. In one embodiment of the invention, the threshold is defined to be large enough to enable proper and meaningful clustering. With a plurality of clusters, a process of clustering reduction takes place so as to extract the most useful data about the cluster and keep it at an optimal size to produce meaningful results. The process of cluster reduction is continuous. When new signatures are provided after the initial phase of the operation of the CP 130, the new signatures may be immediately checked against the reduced clusters to save on the operation of the CP 130. A more detailed description of the operation of the CP 130 is provided herein below.

A concept generator (CG) 140 operates to create concept structures from the reduced clusters provided by the CP 130. Each concept structure comprises a plurality of metadata associated with the reduced clusters. The result is a compact representation of a concept that can now be easily compared against a MMDE to determine if the received MMDE matches a concept structure stored, for example in the DB 150, by the CG 140. This can be done, for example and without limitation, by providing a query to the DCC system 100 for finding a match between a concept structure and a MMDE. A more detailed description of the operation of the CG 140 is provided herein below.

It should be appreciated that the DCC system 100 can generate a number of concept structures significantly smaller than the number of MMDEs. For example, if one billion ($10^9$) MMDEs need to be checked for a match against another one billon MMDEs, typically the result is that no less than $10^9 \times 10^9 = 10^{18}$ matches have to take place, a daunting undertaking. The DCC system 100 would typically have around 10 million ($10^6$) concept structures or less, and therefore at most only $2 \times 10^6 \times 10^9 = 2 \times 10^{15}$ comparisons need to take place, a mere 0.2% of the number of matches that had to be made by other solutions. As the number of concept structures grows significantly slower than the number of MMDEs, the advantages of the DCC system 100 would be apparent to one with ordinary skill in the art.

The DCC system 100 further includes a matching engine 170 that receives a signature generated responsive to an input MMDE and matches the signature to the signatures or a cluster of signatures stored in the DB 150.

The operation of the PAP 110 will now be provided in greater detail with respect to an image as the MMDE. However, this should not be understood as to limit the scope of the invention; other types of MMDEs are specifically included herein and may be handled by the PAP 110.

Figure 2:
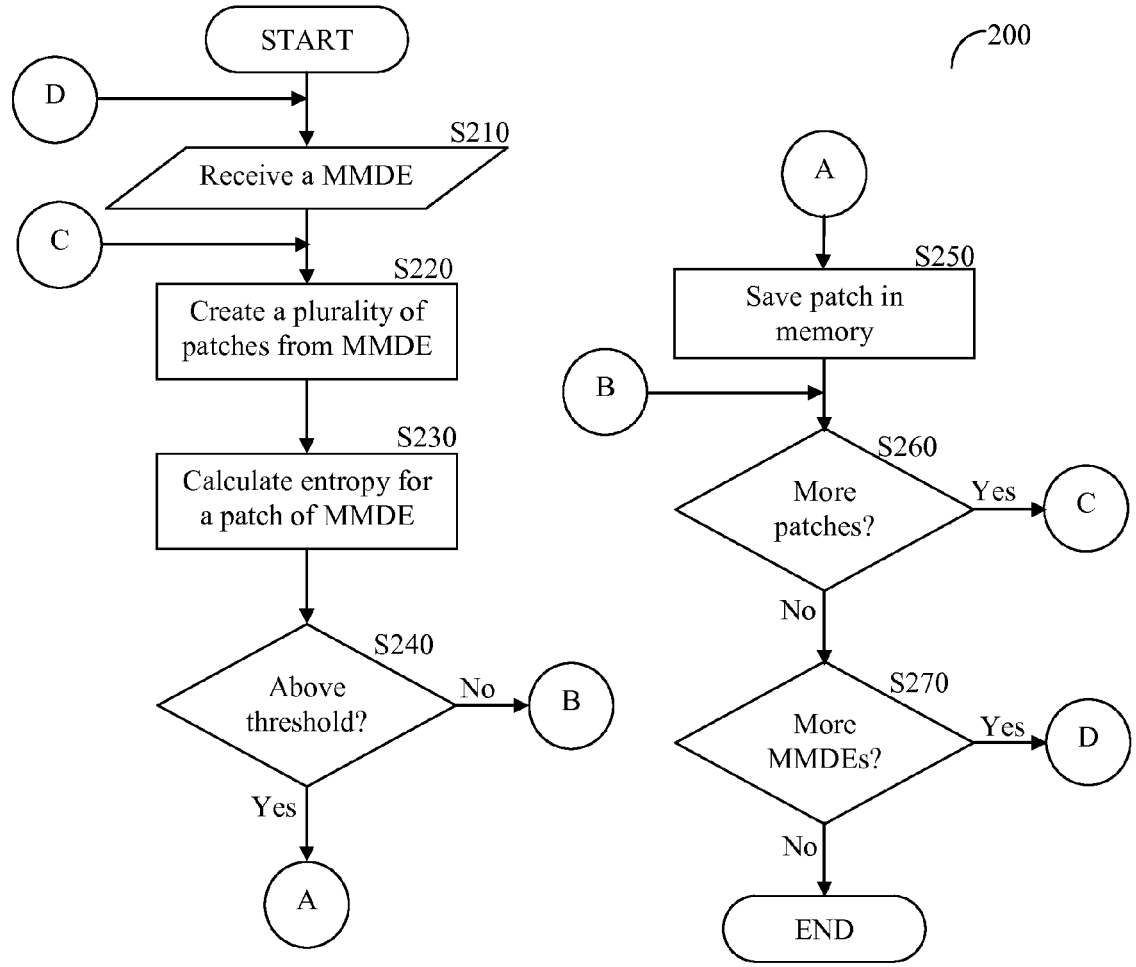
FIG. 2 is a flowchart illustrating the operation of the patch attention processor in accordance with an embodiment of the invention.

FIG. 2 depicts an exemplary and non-limiting flowchart 200 of the operation of the PAP 110. In S210 the PAP110 receives a MMDE from a source for such MMDEs. Such source may be a system that feeds the DCC system 100 with MMDEs or other sources for MMDEs, for example the world-wide-web (WWW). In S220 the PAP 110 creates a plurality of patches from the MMDE. A patch of an image is defined by, for example, its size, scale, location, and orientation. A patch may be, for example and without limitation, a portion of an image of a size 20 pixels by 20 pixels of an image that is 1,000 pixels by 500 pixels. In the case of audio, a patch may be a segment of audio 0.5 seconds in length from a 5-minute audio clip. In S230 a patch not previously checked is processed to determine its entropy. The entropy is a measure of the amount of interesting information that may be present in the patch. For example, a continuous color of the patch has little interest while sharp edges, corners or borders, will result in higher entropy representing a lot of interesting information. In one embodiment a plurality of statistically independent cores, the operation of which is discussed in more detailed herein below, is used to determine the level-of-interest of the image and a process of voting takes place to determine whether the patch is of interest or not.

In S240 it is checked whether the entropy was determined to be above a predefined threshold, and if so execution continues with S250; otherwise, execution continues with S260. In S250 the patch having entropy above the threshold is stored for future use by the SG 120 in, for example, DB 150. In S260 it is checked whether there are more patches of the MMDE to be checked, and if so execution continues with S220; otherwise execution continues with S270. In S270 it is checked whether there are additional MMDEs, and if so execution continues with S210; otherwise, execution terminates. It would be appreciated by those of skill in the art that this process reduces the information that must be handled by the DCC system 100 by focusing on areas of interest in the MMDEs rather than areas that are less meaningful for the formation of a concept structure.

Figure 3:
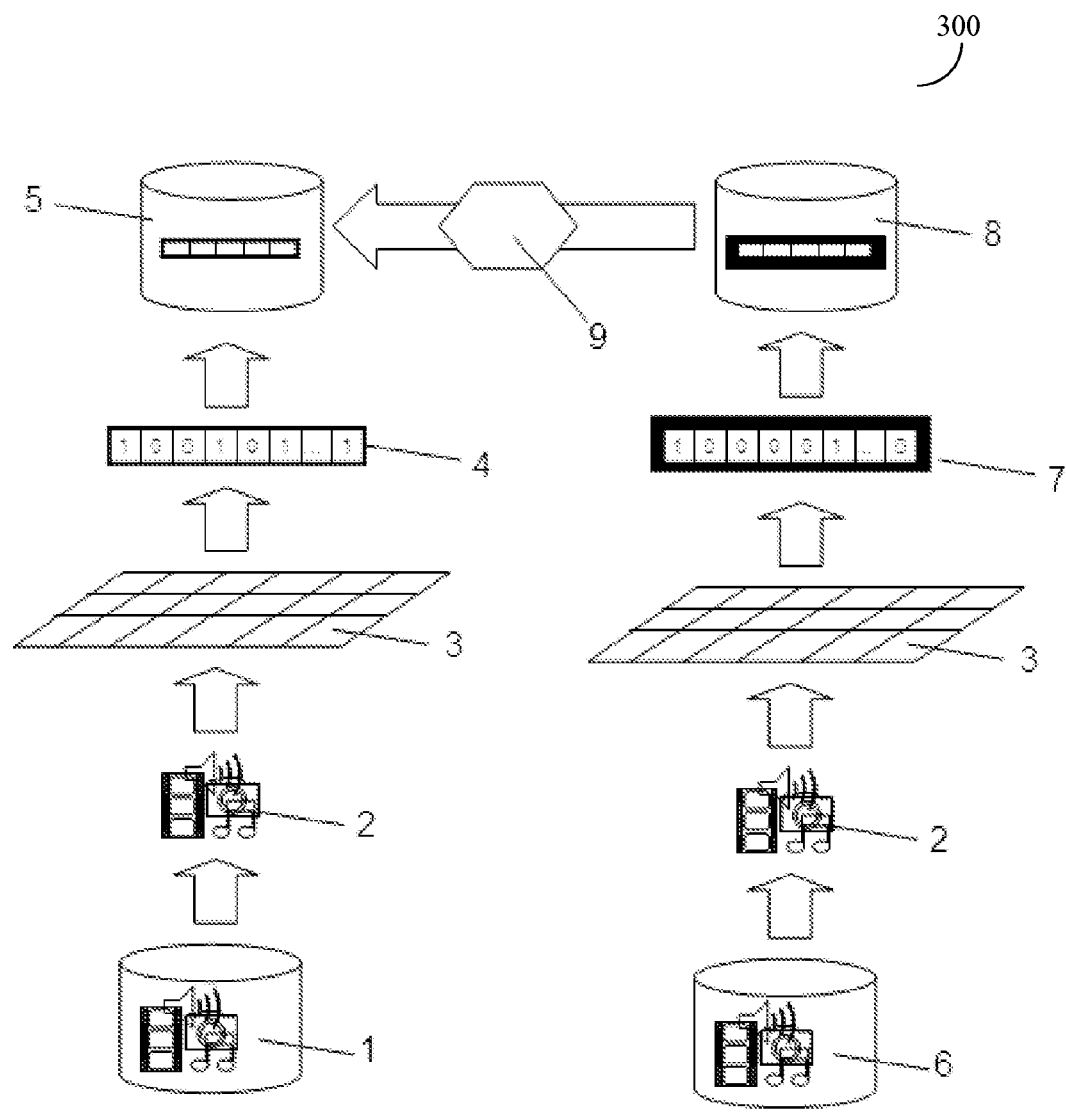
FIG. 3 is a block diagram depicting the basic flow of information in a large-scale video matching system.

A high-level description of the process for large scale video matching performed by the Matching System is depicted in FIG. 3. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Referring back to FIG. 3, at the final step, Target Robust Signatures and/or Signatures are effectively matched, by a matching algorithm 9, to Master Robust Signatures and/or Signatures database to find all matches between the two databases.

A brief description of the operation of the SG 120 is therefore provided, this time with respect to a MMDE which is a sound clip. However, this should not be understood as to limit the scope of the invention and other types of MMDEs are specifically included herein and may be handled by SG 120. To demonstrate an example of signature generation process, it is assumed, merely for the sake of simplicity and without limitation on the generality of the invention, that the signatures are based on a single frame, leading to certain simplification of the computational core's generation. The Matching System shown in FIG. 3 is extensible for signatures generation capturing the dynamics in-between the frames and the information of the frame's patches.

Figure 4:
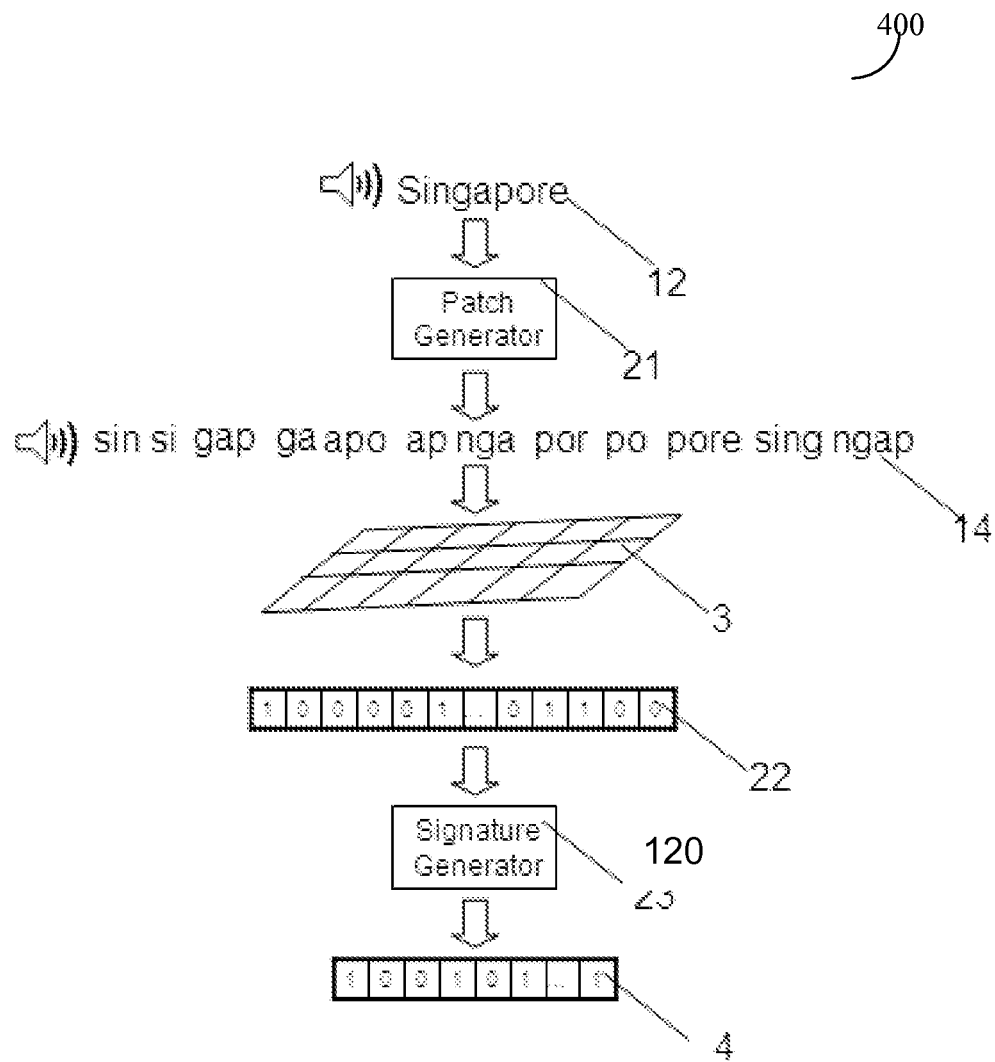
FIG. 4 is a diagram showing the flow of patches generation, response vector generation, and signature generation in a large-scale speech-to-text system.

The signatures generation process will be described with reference to FIG. 4. The first step in the process of signatures generation from a given speech-segment is to break-down the speech-segment to K patches 14 of random length P and random position within the speech segment 12. The breakdown is performed by the patch generator component 21. The value of K is determined based on optimization, considering the tradeoff between accuracy rate and the number of fast matches required in the flow process of the System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The computational cores 3 generate two binary response vectors: $\vec{S}$ which is a Signature vector, and $\overline{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$n_i = \theta(V_i - Th_x)$; $\theta$ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature (ThS) and Robust Signature (ThRS) are set apart, after optimization, according to at least one or more of the following criteria:

I: For: $V_i > Th_{RS}$ $$1 - p(V > Th_S) = 1 - (1 - \epsilon^l << 1$$

i.e., given that I nodes (cores) constitute a Robust Signature of a certain image I, the probability that not all of these I nodes will belong to the Signature of same, but noisy image, $\tilde{I}$ is sufficiently low (according to a system's specified accuracy).

II:

$$p(V_i > Th_{RS}) \approx l/L$$

i.e., approximately I out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison of the original data. Detailed description of the signature generation process can be found in the co-pending patent applications of which this patent application is a continuation-in-part of, and are hereby incorporated by reference.

Computational Core generation is a process of definition, selection, and tuning of the Architecture parameters for a certain realization in a specific system and application. The process is based on several design considerations, such as: (a) the Cores should be designed so as to obtain maximal independence, i.e. the projection from a signal space should generate a maximal pair-wise distance between any two cores' projections into a high-dimensional space; (b) the Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power; and, (c) the Cores should be optimally designed with regard to invariance to set of signal distortions, of interest in relevant application.

Hence, in accordance with the principle of the invention, signatures are generated by the SG 120 responsive of patches received either from the PAP 110, or retrieved from the DB 150, in accordance with the principles shown hereinabove. It should be noted that other ways for generating signatures may also be used for the purpose the DCC system 100 and are explicitly considered part of the invention. Furthermore, as noted above, the array of cores may be used by the PAP 110 for the purpose of determining if a patch has an entropy level that is of interest for signature generation according to the principles of the invention. The generated signatures are stored, for example, in the DB 150, with reference to the MMDE and the patch for which it was generated thereby enabling back annotation as may be necessary.

Portions of the CP 130 have been discussed in detail in the co-pending U.S. patent application Ser. No. 12/507,489, entitled "Unsupervised Clustering of Multimedia Data Using a Large-Scale Matching System", filed Jul. 22, 2009, assigned to common assignee (the "'489 application"), and which is hereby incorporated for all that it contains. In accordance with an embodiment an inter-match process and clustering thereof is utilized. The process can be performed on signatures provided by the SG 120. It should be noted though that this inter-matching and clustering process is merely an example for the operation of the CP 130 and other inter-matching and/or clustering processes may be used for the purpose of the invention.

Following is a brief description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. According to one embodiment of the invention, each cluster is represented by a small/compressed number of signatures, for example, signatures generated by SG 12 as further explained hereinabove, which can be increased by variants. This results in a highly compressed representation of the content-universe. In one embodiment of the invention a connection graph between the multimedia data elements of a cluster may be stored. The graph can then be used to assist a user searching for data to move along the graph in the search of a desired multimedia data element.

In another embodiment, upon determination of a cluster, a signature for the whole cluster may be generated based on the signatures of the multimedia data elements that belong to the cluster. It should be appreciated that using a Bloom filter may be used to reach such signatures. Furthermore, as the signatures in accordance with the principles of the disclosed invention are correlated to some extent, the hash functions of the Bloom filter may be replace by simpler pattern detectors, with the Bloom filter being the upper limit.

While signatures are used here as the basic data elements, it should be realized that other data elements may be clustered using the principles of the invention. For example, a system generating data items is used, where the data items generated may be clustered according to the disclosed principles. Such data items may be, without limitation, multimedia data elements. The clustering process may be performed by dedicated hardware or using a computing device having storage to store the data items generated by the system and then performing the process described herein above. Then, the clusters can be stored in memory for use as may be deemed necessary.

The CP 130 further uses an engine designed to reduce the number of signatures used in a structure, in a sense, extracting only the most meaningful signatures that identify the cluster uniquely. This can be done by testing a removal of a signature from a cluster and checking if the MMDEs associated with the cluster still are capable of being recognized by the cluster through signature matching. The process of signature extraction is on-going as the DCC system 100 operates. It should be noted that after initialization, upon signature generation by the SG 120 of a MMDE, its respective signature is first checked against the clusters to determine if there is a match, and if so it may not be necessary to add the signature to the cluster or clusters, but rather simply associating the MMDE with the identified cluster or clusters. However, in some cases where additional refinement of the concept structure is possible, the signature may be added, or at times even replace one or more of the existing signatures in the reduced cluster. If no match is found then the process of inter-matching and clustering may take place.

Figure 5:
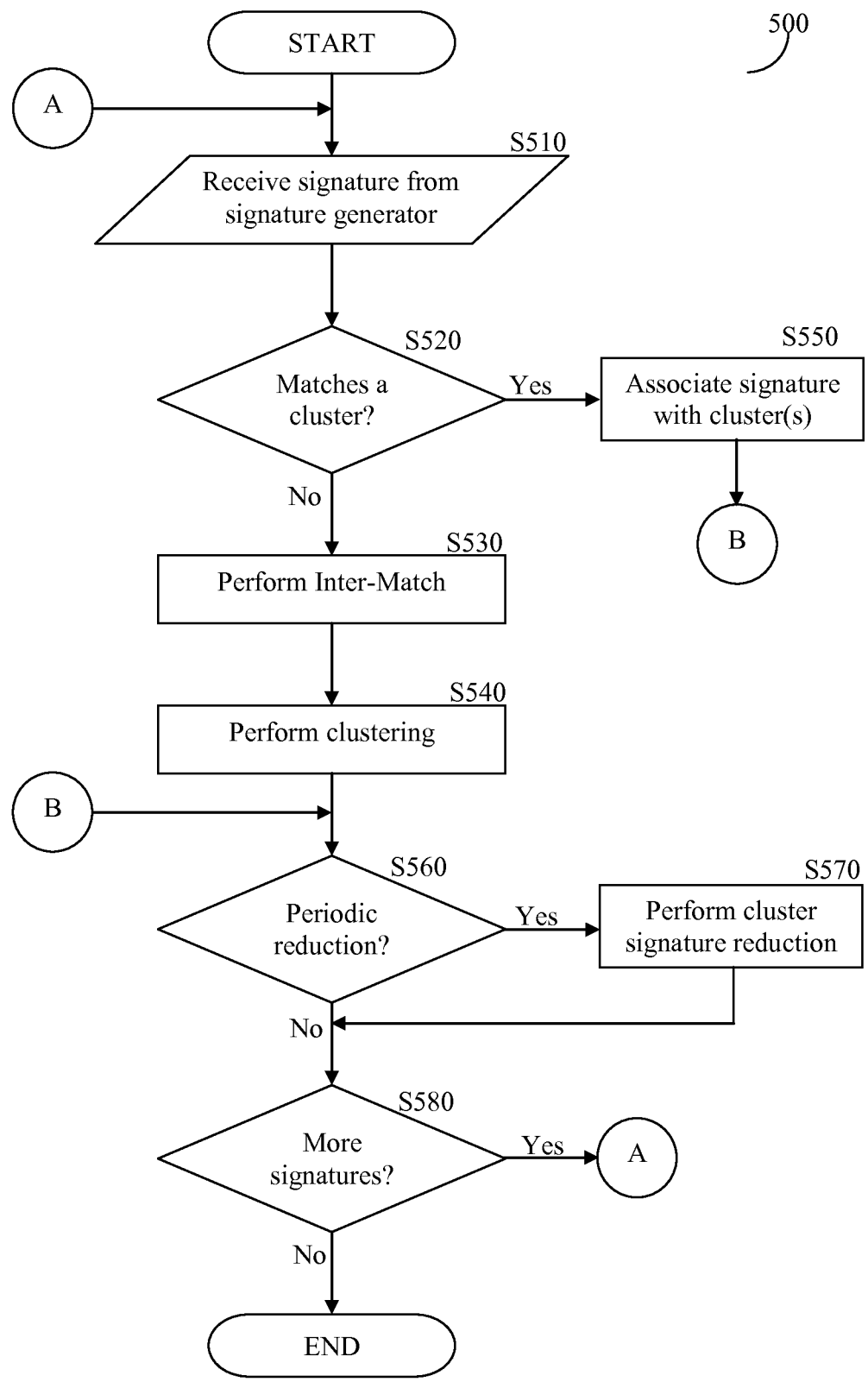
FIG. 5 is a flowchart illustrating the operation of the clustering processor in accordance with the principles of the invention.

FIG. 5 depicts an exemplary and non-limiting flowchart 500 of the operation of the CP 130. In S510, a signature of a MMDE is received, for example from the SG 120. In S520, it is checked whether the signature matches one or more existing clusters and if so execution continues with S550; otherwise, execution continues with S530. In S530 an inter-match between a plurality of signatures previously received by the DCC system 100 is performed, for example in accordance with the principles of the '489 application. As may be necessary the DB 150 may be used to store results or intermediate results as the case may be, however, other memory elements may be used. In S540, a clustering process takes place, for example in accordance with the principles of the '489 application. As may be necessary the DB 150 may be used to store results or intermediate results as the case may be, however, other memory elements may be used.

In S550, the signature identified to match one or more clusters is associated with the existing cluster(s). In S560, it is checked whether a periodic cluster reduction is to be performed, and if so execution continues with S570; otherwise, execution continues with S580. In S570 the cluster reduction process is performed. Specifically, the purpose of the operation is to ensure that in the cluster there remains the minimal number of signatures that still identify all of the MMDEs that are associated with the signature-reduced cluster (SRC). This can be performed, for example, by attempting to match the signatures of each of the MMDEs associated with the SRC having one or more signatures removed there from. In one embodiment of the invention the process of cluster reduction for the purpose of generating SRCs is performed in parallel and independently of the process described herein above. In such a case after either S540 or S550 the operation of S580 takes place. In S580, it is checked whether there are additional signatures to be processed and if so execution continues with S510; otherwise, execution terminates. SRCs may be stored in memory, such as DB 150, for the purpose of being used by other elements comprising the DCC system 100.

The CG 140 performs two tasks, it associates metadata to the SRCs provided by the CP 130, and it associates between similar clusters based on commonality of metadata. Exemplary and non-limiting methods for associating metadata with MMDEs is described in U.S. patent application Ser. No. 12/348,888, entitled "Methods for Identifying Relevant Metadata for Multimedia Data of a Large-Scale Matching System", filed on Jan. 5, 2009, assigned to common assignee (the "'888 application"), and which is hereby incorporated for all that it contains. One embodiment of the '888 application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 application includes a system for collecting metadata for a first MMDE. The system comprises a plurality of computational cores enabled to receive the first MMDE, each core having properties to be statistically independent of each other core, each generate responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generate a respective first signature of said first MMDE and/or a second signature of said first MMDE, for the purpose of determining a match with at least a second MMDE stored in the storage and associating metadata associated with the at least second MMDE with the first MMDE.

Similar processes to match metadata with a MMDE or signatures thereof may be used in accordance with the invention, however, these should be viewed only as exemplary and non-limiting implementations, and other methods of operation may be used with respect to the DCC system 100 without departing from the scope of the invention. Accordingly, each SRC is associated with metadata which is the combination of the metadata associated with each of the signatures that are included in the respective SRC, preferably without repetition of metadata. A plurality of SRCs having metadata may now be associated to each other based on the metadata and/or partial match of signatures. For example, and without limitation, if the metadata of a first SRC and the metadata of a second SRC overlap more than a predetermined threshold level, for example 50% of the metadata match, they may be considered associated clusters that form a concept structure. Similarly, a second threshold level can be used to determine if there is an association between two SRCs where at least a number of signatures above the second threshold are identified as a match with another SRC. From a practical example one may want to consider the concept of Abraham Lincoln where images of the late President and features thereof, appear in a large variety of photographs, drawings, paintings, sculptures and more and are associated as a concept structure of the concept "Abraham Lincoln". Each concept structure may be then stored in memory, for example, the DB 150 for further use.

Figure 6:
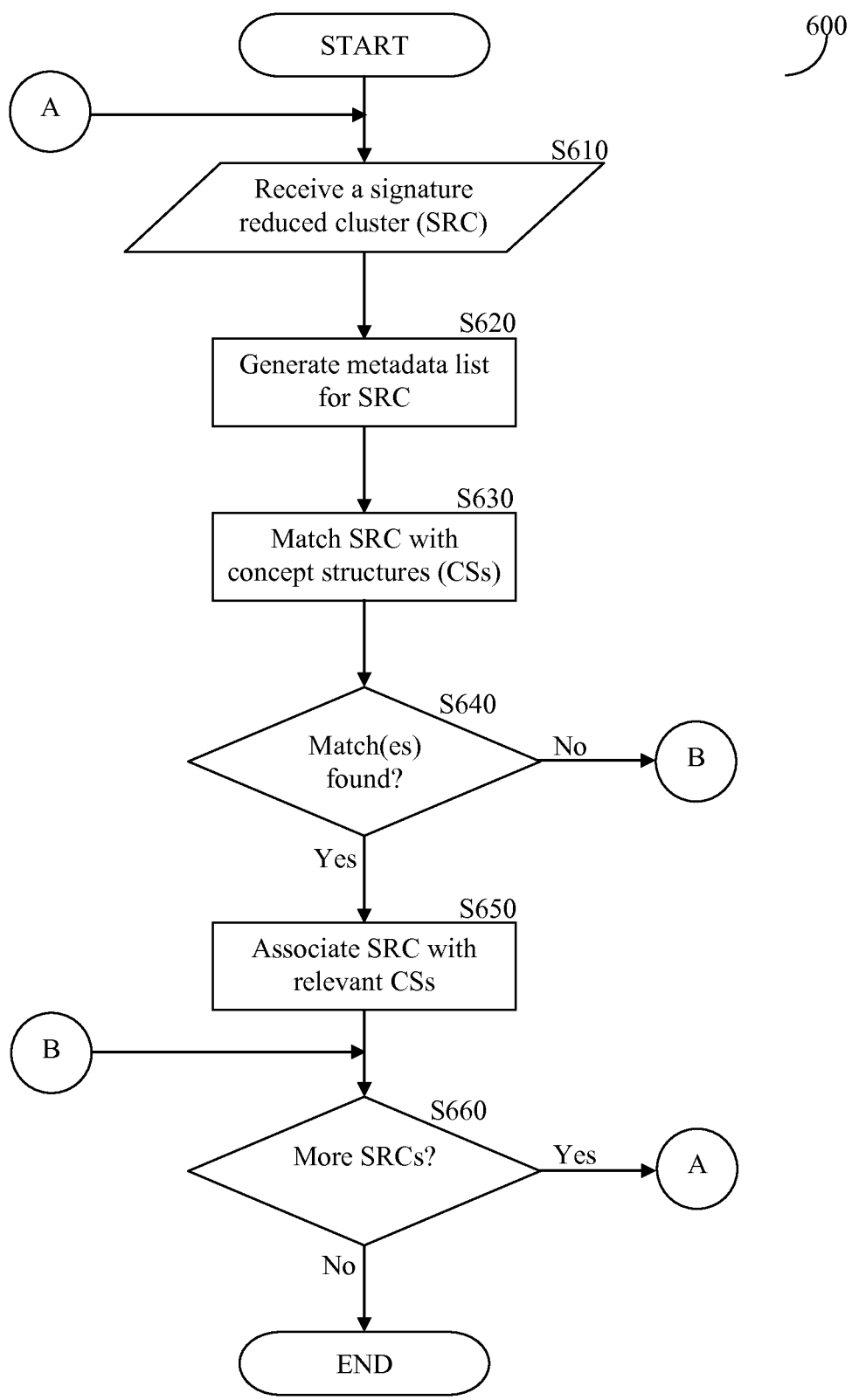
FIG. 6 is a flowchart illustrating the operation of the concept generator in accordance with the principles of the invention.

FIG. 6 shows an exemplary and non-limiting flowchart 600 of the operation of the CG 140 realized in accordance with the principles of the invention. In S610 the CG 140 receives a SRC from either the CP 130 or by accessing memory, for example, the DB 150. In S620 metadata are generated for the signatures of the SRC, for example in accordance with the principles described hereinabove. A list of the metadata is created for the SRC preferably with no metadata duplication. In one embodiment the commonality of metadata is used to signify the strength of the metadata with respect to a signature and/or the SRC, i.e., a higher number of metadata repetitions is of more importance to the SRC than a lower number of repetitions. Furthermore, in one embodiment a threshold may be used to remove those metadata that have a significantly low rate of repetition as not being representative of the SRC.

In S630, the SRC is matched to previously generated SRCs to attempt to find various matches, as described, for example, hereinabove in more detail. In S640, it is checked if at least one match was found and if so, execution continues with S650; otherwise, execution continues with S660. In S650, the SRC is associated with one or more of the concept structures to which the SRC has shown to match. In S660, it is checked whether additional SRCs are to be received and if so execution continues with S610; otherwise, execution terminates.

A person skilled in the art would now appreciate the advantages of the DCC system 100 and methods thereof. The DCC system 100 is capable of creating automatically and in an unsupervised fashion concept structures of a wide variety of MMDEs. When checking a new MMDE it may be checked against the concept structures stored, for example, in the DB 150, and upon detection of a match providing the concept information about the MMDE. With the number of concept structures being significantly lower than the number of MMDEs the solution is cost effective and scalable for the purpose of identification of content of a MMDE.

The various advantages of the DCC system 100 may be utilized to link MMDEs to web pages. For example, this embodiment would enable a user to take a picture of a place (e.g., Statue of Liberty) and upload the picture to the DCC system 100 through a network. The DCC system 100 by performing, for example, the signature matching process described herein, automatically redirects the user to one or more web sites that contain the uploaded picture and/or web page that associated with the picture, (e.g., a map of the Liberty Island).

Figure 7:
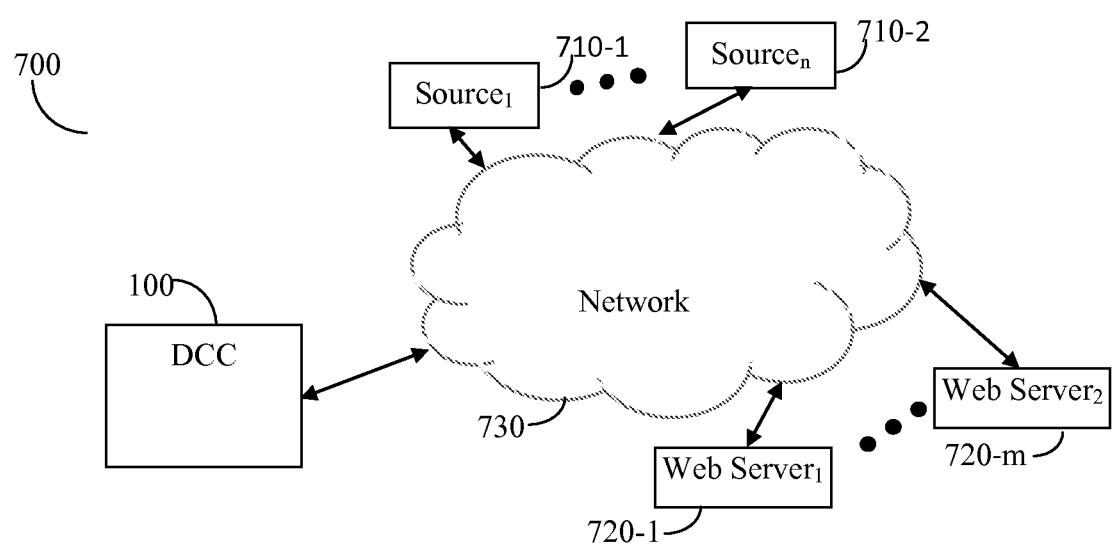
FIG. 7 is a system for linking MMDEs to web pages in accordance with the principles of the invention.

FIG. 7 shows an exemplary and non-limiting system 700 for receiving an MMDE and locating an associated URL in accordance with the principles of the invention. The DCC system 100 is described in greater detail with respect to FIG. 1 and following figures thereto and hence its description is not repeated herein below. However, it should be noted that the specific signature generation described hereinabove shout not be viewed as limiting upon this invention, and other signatures or identification of an image may be used without departing from the spirit of the invention. The DCC system 100 is connected to the network 730, which include a local area network (LAN), a wide area network (WAN), a metro area network (MAN), the Internet, the world-wide web (WWW), and other like networks, as well as various combinations thereof. The network 730 may be further comprised of wired or wireless networks and any combination thereof. The network 730 is connected to a plurality sources 710 of MMDEs, for example, sources 710-1 through 710-n Each source 710-i each being capable of capturing MMDEs and supplying them over the network 730 either directly or indirectly, e.g., stored in memory and then transferred from the memory over the network 730. Sources 710-1 through 710-n may include, but are not limited to, mobile phones, smart phones, personal digital assistants (PDAs), personal computers (PCs), and the like. When an MMDE is supplied from a source 710-i to the DCC system 100, a signature corresponding to the MMDE is generated by the DCC system 100.

According to the principles of the invention, the signature generated responsive of the MMDE is than compared to signatures stored in the database (e.g., database 150) of DCC system 100. It should be noted that the signature of the received MMED may be compared to a signature of another MMDE and/or also to a signature representative of a cluster of MMDEs. At least a portion of the signatures stored in the database of DCC system 100 should have a metadata value that contains a uniform resource locator (URL) that is associated with the stored signature and that provides a link to a web page. The web page may reside on one of the web servers 720, for example, one of the web servers 720-1 through 720-m. If a match is found between the signature generated for the received MMDE and a signature stored in the database, the respective URL of the matching signature is extracted, is such URL exists. The URL value can then be returned to the initiating source 710-i and/or to launch the corresponding web page for display on a resource display.

Figure 8:
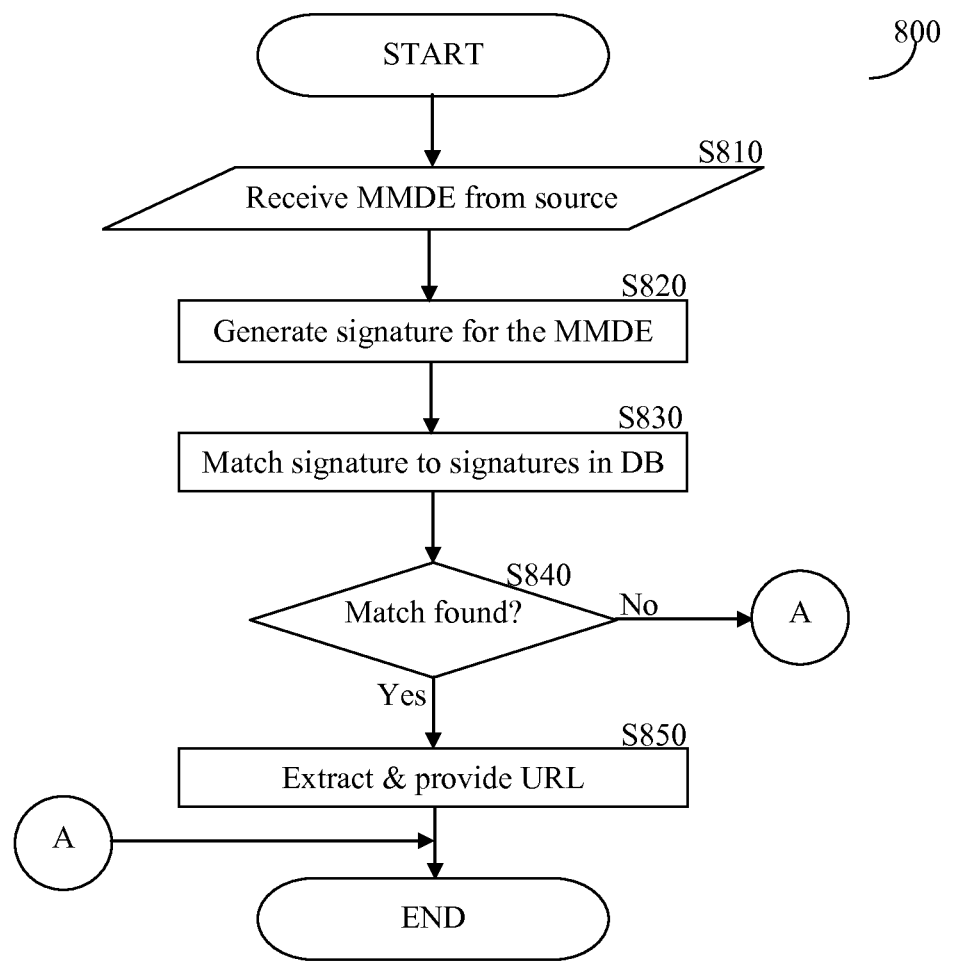
FIG. 8 is a flowchart illustrating a method for linking MMDEs to web pages in accordance with the principles of the invention.

FIG. 8 shows an exemplary and non-limiting flowchart 800 illustrating the method for linking an MMDE to a corresponding URL in accordance with the principles of the invention. In S810, an MMDE is received by the DCC system 100 from a source 710, for example, source 710-1. In S820, a signature is generated for the received MMDE by the DCC system 100. In S830, the generated signature is matched against the signatures or a cluster of signature stored in the database of the DCC system 100. In S840 if a match is found, execution continues with S850; otherwise, execution terminates. In accordance with an embodiment of the invention, the matches are performed between the generated signature and each signature or a cluster of signatures in the DB 150 to find those that may have close correlation to the generated signature. For each match that is found, a score is computed and then compared to a predefined threshold. If at least one score of a respective match is above a predetermined threshold, it is determined that a match exists.

In S850, a URL associated as a metadata to the matched signature is extracted and provided as may be necessary to enable access to the web pages on a web server 720, for example web server 720-1. Hence, if the MMDE is a picture of a place, the process would lead to an access to a web page having its URL associated as a metadata to the signature that best matched the generated signature. Similarly, if the MMDE is an audio clip, a match may enable access to a corresponding web page associated with a signature in the database of DCC system 100 to which the generated signature of the audio clip matched.

In one embodiment of the invention, the generated signature and its corresponding MMDE are stored in the database of DCC system 100 for further use. It may be further clustered with Other signatures as described in more detail hereinabove. Moreover, the URL associated with the matched signature may be associated with the generated signature of the received MMDE for future use. It should be further understood that in a system such as system 700, the more signatures a web page has the more likely it is that an appropriate link will be found respective of a received MMDE. In one embodiment of the invention, where multiple matches are found, a single URL is selected and returned. The selection may be performed randomly or using a weighted decision process favoring those URLs appearing more frequently than others in the matching process. In accordance with another embodiment of the invention, a list of URLs is returned to the initiating source if multiple matches are found. In yet another embodiment, the links may be further sorted according to the degree of match that was found, and further omitting certain cases where the match is below a predefined threshold level.

The principles of the invention are implemented as hardware, firmware, software, or any combination thereof. Moreover, the software is preferably implemented as an application program tangibly embodied on a program storage unit or non-transitory computer readable medium or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for linking between a multimedia data element (MMDE) and a web page, comprising:
   receiving a MMDE from a source;
   dividing the received MMDE into a plurality of segments of random length and random position using a patch generator;
   generating a signature representative of the received MMDE using a signature generator;
   matching the generated signature with a plurality of concept structures stored in a database to find at least one matching concept structure, wherein each concept structure is a collection of signatures and metadata describing the concept structure, the collection of signatures of the concept structure is a signature reduced cluster generated by inter-matching signatures generated for the plurality of MMDEs, wherein the at least one matching concept is represented using at least one signature;
   storing the signature generated for the received MMDE in the database;
   extracting a universal resource locator (URL) of a web page associated with the at least one matching concept structure, wherein the URL is part of a metadata of the matching concept structure;
   associating the extracted URL with the signature as a metadata of the signature generated for the MMDE; and
   providing the URL to the source over a network.

2. The method of claim 1, further comprising: storing the generated signature in the database; and associating the extracted URL with the signature as a metadata of the signature generated for the MMDE.

3. The method of claim 1, further comprising: selecting a single URL when the matching results in more than one matching concept structure, wherein the selection is based on at least one of: a random selection and weighted decision selection process.

4. The method of claim 3, wherein providing the URL to the source further comprising: enabling display of a webpage corresponding to the URL over a display.

5. The method of claim 1, wherein the MMDE is selected from the group consisting of an image, graphics, a video stream, a video clip, an audio stream, an audio clip, a video frame, a photograph, images of signals, a combinations thereof, and portions thereof.

6. The method of claim 5, wherein the images of signals are images selected from the group consisting of medical signals, geophysical signals, subsonic signals, supersonic signals, electromagnetic signals, and infrared signals.

7. The method of claim 1, wherein the signature generator comprises a plurality of computational cores, each computational core having properties statistically independent of each other computational core, each computational core generates, responsive to the received MMDE, at least a signature comprising of a first signature element and a second signature element, the first signature element being a robust signature, wherein the robust signature is being robust to at least additive noise.

8. The method of claim 1, wherein matching the signature generated for the received MMDE with the plurality of concept structures further comprising matching the generated signature with at least a signature of a cluster of signatures representing the concept structure.

9. The method of claim 8, wherein matching the generated signature with the plurality of concept structures further comprising: matching the generated signature with each of the plurality of signatures of the plurality of concept structures stored in the database; generating a matching score for each match; and determining that a matching signature is found, if at least one matching score is above a predefined threshold.

10. A non-transitory computer readable medium having stored thereon instructions for causing one or more processing units to execute the method according to claim 1.

11. A system for automatic linking between a multimedia data element (MMDE) and a web page, the system comprising:
    a database containing a plurality of concepts structures, wherein at least a portion of the plurality of concept structures having a universal resource locator (URL) of a respective web page associated to as a metadata, wherein each concept structure is a collection of signatures and metadata describing the concept structure, the collection of signatures of the concept structure is a signature reduced cluster generated by inter-matching signatures generated for the plurality of MMDEs, wherein the at least one matching concept is represented using at least one signature;
    a patch generator for receiving a MMDE from a source through a network and dividing the MMDE into a plurality of segments of random length and random position;
    a signature generator for receiving the MMDE from the patch generator and generating a signature for the received MMDE; and
    a matching engine for matching the generated signature for the received MMDE to the plurality of signatures of concept structures —stored in the database and outputting the URL of at least one concept structure matching the generated signature, thereby responsive to receiving the MMDE a web page respective of the URL can be accessed.

12. The system of claim 11, wherein the system is further adapted to: store the generated signature in the database; and associate the extracted URL with the signature as a metadata of the signature generated for the MMDE.

13. The system of claim 11, wherein the signature generator comprises a plurality of computational cores, each computational core having properties statistically independent of each other computational core, each computational core generates, responsive to the received MMDE, at least a signature comprising of a first signature element and a second signature element, the first signature element being a robust signature, wherein the robust signature is being robust to at least additive noise.

14. The system of claim 11, wherein the matching engine is further configured to match the signature generated for the received MMDE with at least a signature of a cluster of signatures representing the concept structure.

15. The system of claim 14, wherein the matching engine is further configured to match the generated signature with each of the plurality of concept structures stored in the database; generate a matching score for each match; and determine that a matching signature is found, if at least one matching score is above a predefined threshold.

16. The system of claim 15, wherein the matching engine is further configured to: select a single URL when the matching results in more than one matching score that is above the threshold, wherein the selection is based on at least one of: a random selection and a weighted decision selection process.

17. The system of claim 11, wherein the MMDE is selected from the group consisting of an image, graphics, a video stream, a video clip, an audio stream, an audio clip, a video frame, a photograph, images of signals, a combinations thereof, and portions thereof.

18. The system of claim 15, wherein the images of signals are images selected from the group consisting of medical signals, geophysical signals, subsonic signals, supersonic signals, electromagnetic signals, and infrared signals.

19. The system of claim 11, wherein the source comprises at least one of: a mobile phone, a smart phone, a personal PC computer, a laptop computer, and a tablet computer.

* * * * *